(12) United States Patent
Lapstun et al.

(10) Patent No.: US 8,281,982 B2
(45) Date of Patent: *Oct. 9, 2012

(54) REGION HAVING CODED DATA, METHOD OF APPLYING CODED DATA THERETO AND SYSTEM FOR INTERACTING THEREWITH

(75) Inventors: Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 1391 days.

This patent is subject to a terminal disclaimer.

(21) Appl. No.: 11/842,948

(22) Filed: Aug. 22, 2007

(65) Prior Publication Data

US 2007/0283315 A1    Dec. 6, 2007

Related U.S. Application Data

(63) Continuation of application No. 10/291,660, filed on Nov. 12, 2002, now Pat. No. 7,299,969, which is a continuation of application No. 09/721,862, filed on Nov. 25, 2000, now Pat. No. 7,182,247, which is a continuation-in-part of application No. 09/575,129, filed on May 23, 2000, now Pat. No. 7,233,320.

(30) Foreign Application Priority Data

| May 25, 1999 | (AU) | ........................................ PQ0559 |
| Jun. 30, 1999 | (AU) | ........................................ PQ1313 |
| Oct. 15, 1999 | (AU) | ........................................ PQ3457 |
| Dec. 1, 1999 | (AU) | ........................................ PQ4392 |

(51) Int. Cl.
*G06F 17/00* (2006.01)

(52) U.S. Cl. ........................................ 235/375; 235/494
(58) Field of Classification Search .................. 345/175, 345/179, 166, 574; 235/462.03, 494, 375; 178/18.09, 19.01–19.05
See application file for complete search history.

(56) References Cited

U.S. PATENT DOCUMENTS

| 3,999,012 | A |   | 12/1976 | Dym |
| 4,588,862 | A |   | 5/1986 | Grabowy |
| 4,937,439 | A | * | 6/1990 | Wanninger et al. ........... 235/456 |
| 5,340,971 | A |   | 8/1994 | Rockstein et al. |
| 5,768,500 | A |   | 6/1998 | Agrawal et al. |
| 5,852,434 | A |   | 12/1998 | Sekendur |
| 5,897,669 | A | * | 4/1999 | Matsui .................... 235/462.07 |
| 5,974,558 | A |   | 10/1999 | Cortopassi et al. |
| 6,050,490 | A | * | 4/2000 | Leichner et al. ......... 235/462.49 |
| 6,208,771 | B1 | * | 3/2001 | Jared et al. ..................... 382/306 |
| 6,281,888 | B1 | * | 8/2001 | Hoffman et al. .............. 345/179 |
| 7,299,969 | B2 | * | 11/2007 | Paul et al. ..................... 235/375 |

FOREIGN PATENT DOCUMENTS

JP    64-23383    1/1989
(Continued)

*Primary Examiner* — Daniel St.Cyr

(57) ABSTRACT

A region having coded data thereon, a method of applying the coded data to the region and a system having a computer system and sensing device for interacting with the region are provided. At least some of the coded data has data indicative of a functional attribute of a part of the region and the coded data has a plurality of substantially undifferentiated marks positioned relative to a set of predetermined nominal mark positions. Each mark has a minimum radius and a maximum radius, where the length of a mark's minimum radius is greater than 40% of the length of that mark's maximum radius.

20 Claims, 11 Drawing Sheets

FOREIGN PATENT DOCUMENTS

| | | |
|---|---|---|
| JP | 06-266490 | 9/1994 |
| JP | 06-508231 | 9/1994 |
| JP | 06-309084 | 11/1994 |
| JP | 07-141104 | 6/1995 |
| JP | 07-239745 | 9/1995 |
| JP | 07-311813 | 11/1995 |
| JP | 07-334296 | 12/1995 |
| JP | 08-36452 | 2/1996 |
| JP | 09-128137 | 5/1997 |
| JP | 09-325963 | 12/1997 |
| JP | 10-171758 | 6/1998 |
| JP | 10-224540 | 8/1998 |
| JP | 2001-51792 | 2/2001 |

* cited by examiner

REGION HAVING CODED DATA, METHOD OF APPLYING CODED DATA THERETO AND SYSTEM FOR INTERACTING THEREWITH

CROSS REFERENCES TO RELATED APPLICATIONS

This application is a Continuation of U.S. Ser. No. 10/291,660 filed Nov. 12, 2002, now issued U.S. Pat. No. 7,299,969, which is a Continuation of U.S. Ser. No. 09/721,862 Filed Nov. 25, 2000, now issued U.S. Pat. No. 7,182,247, which is a Continuation-In-Part of 09/575,129, now issued U.S. Pat. No. 7,233,320, all of which is herein incorporated by reference.

FIELD OF INVENTION

The present invention relates generally to methods, systems an devices for interacting with computer systems, and in particular, to coded surfaces supporting such interaction.

CO-PENDING APPLICATIONS

Various methods, systems and apparatus relating to the present invention are disclosed in the following co-pending applications/granted patents filed by the applicant or assignee of the present invention with the present invention:

| | | | | | |
|---|---|---|---|---|---|
| 6,530,339 | 6,631,897 | 09/721,895 | 09/722,174 | 7,175,079 | 7,064,851 |
| 6,826,547 | 6,741,871 | 6,927,871 | 6,980,306 | 6,965,439 | 6,788,982 |
| 09/722,141 | 6,788,293 | 6,946,672 | 7,091,960 | 6,792,165 | 7,105,753 |
| 7,182,247 | | | | | |

The disclosures of these co-pending applications are incorporated herein by cross-reference.

Various methods, systems and apparatus relating to the present invention are disclosed in the following co-pending applications/granted patents filed by the applicant or assignee of the present invention on 20 Oct. 2000:

| | | | | | |
|---|---|---|---|---|---|
| 7,190,474 | 7,110,126 | 6,813,558 | 6,965,454 | 6,847,883 | 7,131,058 |
| 09/693,690 | 6,982,798 | 6,474,888 | 6,627,870 | 6,724,374 | 09/693,514 |
| 6,454,482 | 6,808,330 | 6,527,365 | 6,474,773 | 6,550,997 | |

The disclosures of these co-pending applications are incorporated herein by cross-reference.

Various methods, systems and apparatus relating to the present invention are disclosed in the following co-pending applications/granted patents filed by the applicant or assignee of the present invention on 15 Sep. 2000:

| | | | |
|---|---|---|---|
| 6,679,420 | 6,720,985 | 6,963,845 | 6,995,859 |

The disclosures of these co-pending applications are incorporated herein by cross-reference.

Various methods, systems and apparatus relating to the present invention are disclosed in the following co-pending applications/granted patents filed by the applicant or assignee of the present invention on 30 Jun. 2000:

| | | | | | |
|---|---|---|---|---|---|
| 6,824,044 | 6,678,499 | 6,976,220 | 6,976,035 | 6,766,942 | 09/609,303 |
| 6,922,779 | 6,978,019 | 09/607,843 | 6,959,298 | 6,973,450 | 7150404 |
| 6,965,882 | 7,233,924 | 7,007,851 | 6,957,921 | 6,457,883 | 6,831,682 |
| 6,977,751 | 6,398,332 | 6,394,573 | 6,622,923 | | |

The disclosures of these co-pending applications are incorporated herein by cross-reference.

Various methods, systems and apparatus relating to the present invention are disclosed in the following co-pending applications/granted patents filed by the applicant or assignee of the present invention on 23 May 2000:

| | | | | | |
|---|---|---|---|---|---|
| 6,428,133 | 6,526,658 | 6,315,399 | 6,338,548 | 6,540,319 | 6,328,431 |
| 6,328,425 | 6,991,320 | 6,383,833 | 6,464,332 | 6,390,591 | 7,018,016 |
| 6,328,417 | 09/575,197 | 7,079,712 | 6,825,945 | 09/575,165 | 6,813,039 |
| 6,987,506 | 7,038,797 | 6,980,318 | 6,816,274 | 7,102,772 | 09/575,186 |
| 6,681,045 | 6,728,000 | 7,173,722 | 7,088,459 | 09/575,181 | 7,068,382 |
| 7,062,651 | 6,789,194 | 6,789,191 | 6,644,642 | 6,502,614 | 6,622,999 |
| 6,669,385 | 6,549,935 | 6,987,573 | 6,727,996 | 6,591,884 | 6,439,706 |
| 6,760,119 | 09/575,198 | 6,290,349 | 6,428,155 | 6,785,016 | 6,870,966 |
| 6,822,639 | 6,737,591 | 7,055,739 | 7,233,320 | 6,830,196 | 6,832,717 |
| 6,957,768 | 09/575,172 | 7,170,499 | 7,106,888 | 7,123,239 | 6,409,323 |
| 6,281,912 | 6,604,810 | 6,318,920 | 6,795,215 | 7,154,638 | 6,859,289 |

The disclosures of these co-pending applications are incorporated herein by cross-reference.

BACKGROUND

Systems have been described wherein pen- or stylus-like devices sense their own movement relative to a surface, for the purposes of providing input to a computer system, by detecting information which is invisibly but machine-readably encoded on the surface. See for example U.S. Pat. No. 5,477,012, U.S. Pat. No. 5,652,412 and PCT application WO99/50787. Visible information intended for human consumption may also be placed on the surface, although typically in a separate step which therefore may include recording an association between the two kinds of information. The encoded information doesn't include knowledge of the content of the visible information, and any content-specific feedback provided to a user during the user's interaction with the encoded information must be provided on the basis of the recorded association. If the recorded association is remote or unavailable, timely feedback may be impossible to provide.

SUMMARY OF INVENTION

According to a first aspect, the present invention provides a region having coded data thereon, wherein at least some of the coded data includes data indicative of a functional attribute of a part of the region.

Preferably, the functional attribute indicates at least one of the group comprising: a hyperlink, a hypertext link, a button, a drawing field, a text field and a signature field.

Some of the coded data may include data indicative of a location, data indicative of an identity, or data indicative of an identity and a location.

The identity may be indicative of a location in the region, or of an identity of the region.

According to a second aspect, the present invention provides a method of coding a region including applying coded data to at least a part of the region which indicates a functional attribute of a part of the region.

Preferably, the functional attribute indicates at least one of the group comprising: a hyperlink, a hypertext link, a button, a drawing field, a text field and a signature field.

According to a third aspect, the present invention provides a sensing device for use with a region having coded data thereon, at least some of the coded data including data indicative of a functional attribute of a part of the region, the sensing device for sensing and reacting to data indicative of a functional attribute of a part of the region.

Preferably, the sensing device provides at least one indication to a user when it senses data indicative of a functional attribute of a part of the region.

Preferably, the indication is selected from the group comprising a visual, aural, haptic, tactile, vibratory and any other human sensory modality.

Preferably also, when the sensing device senses data indicative of a functional attribute of a part of the region, the sensing device transmits, to a computer system, said sensed data or data based at least partially on said sensed data.

According to a fourth aspect, the present invention provides a system including:

computer system, and a sensing device for use with a region having coded data thereon, at least some of the coded data including data indicative of a functional attribute of a part of the region, the sensing device for sensing data indicative of a functional attribute of a part of the region and for transmitting, to the computer system, said sensed data or data based at least partially on said sensed data, wherein the computer system executes, or commences execution of, a function related to the functional attribute of the sensed data.

Preferably, the computer system verifies that the functional attribute is consistent with an expected attribute of the respective part of the region.

BRIEF DESCRIPTION OF DRAWINGS

Preferred and other embodiments of the invention will now be described, by way of non-limiting example only, with reference to the accompanying drawings, in which:

FIG. 5c is a plan view showing an arrangement of nine of the tags shown in FIG. 5a where targets are shared between adjacent tags;

FIG. 5d is a plan view showing the interleaving and rotation of the symbols of the four codewords of the tag shown in FIG. 5a;

DETAILED DESCRIPTION OF PREFERRED AND OTHER EMBODIMENTS

Note: Memjet™ is a trademark of Silverbrook Research Pty Ltd, Australia.

In the preferred embodiment, the invention is configured to work with the netpage networked computer system, a summary of which is given below and a detailed description of which is given in our co-pending applications, including in particular applications U.S. Ser. No. 09/721,893, U.S. Ser. No. 09/722,142, U.S. Ser. No. 09/575,129 and U.S. Ser. No. 09/575,141. It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper or other media, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
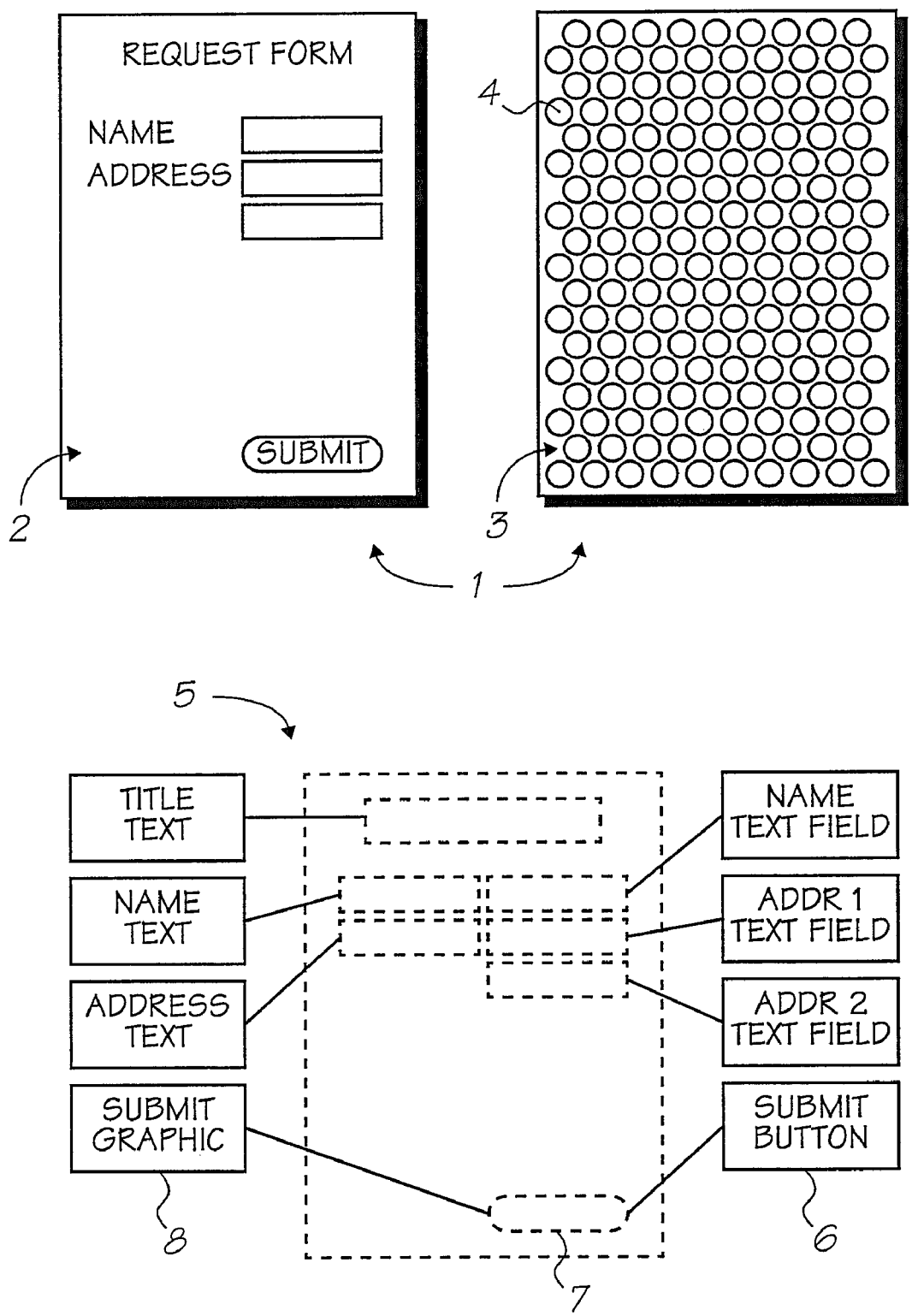
FIG. 1 is a schematic of a the relationship between a sample printed netpage and its online page description.

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
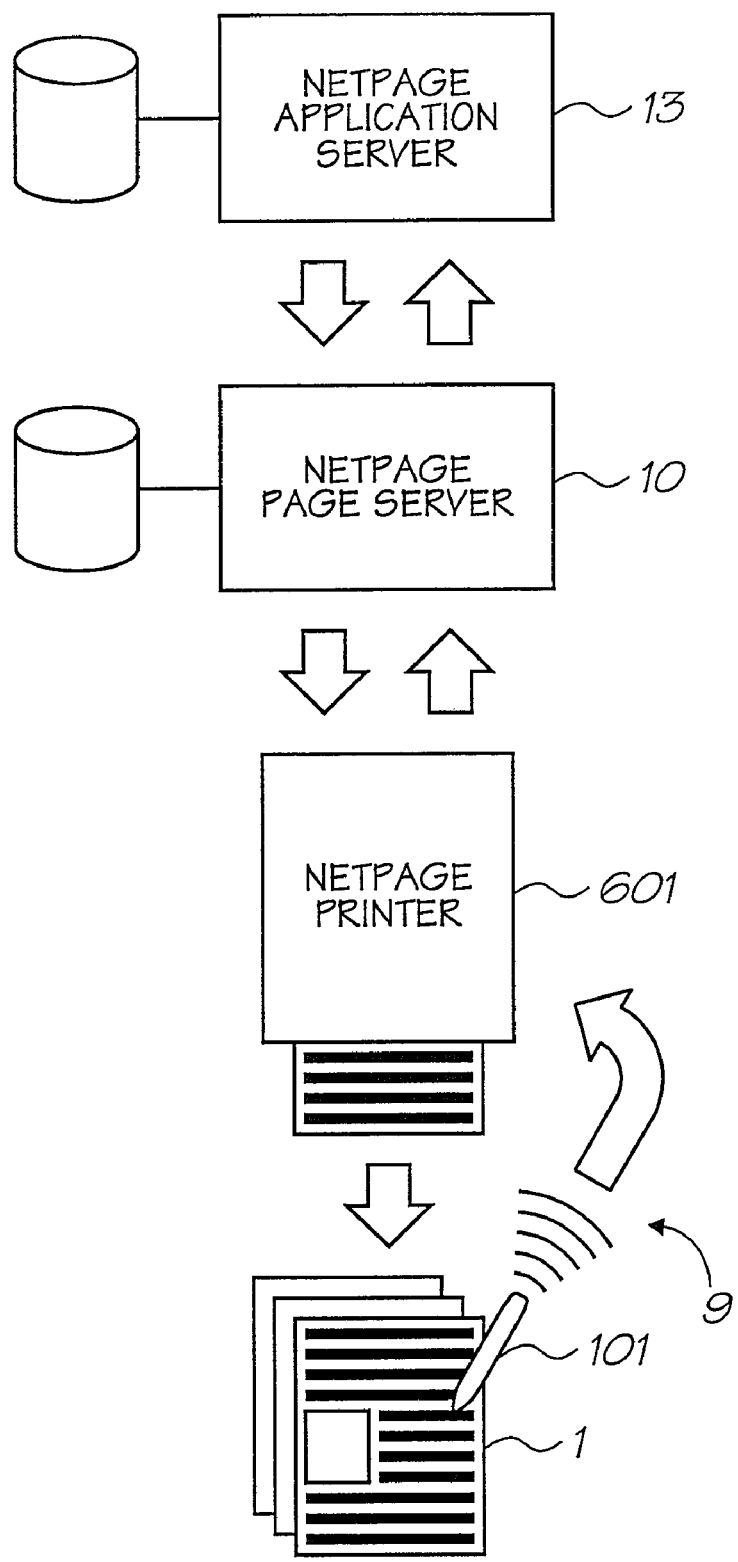
FIG. 2 is a schematic view of a interaction between a pen with an attached netpage code sensor attachment, a netpage printer, a netpage page server, and a netpage application server.

As illustrated in FIG. 2, the netpage pen 101, a preferred form of which is described in our co-pending application U.S. Ser. No. 09/721,893, works in conjunction with a netpage printer 601, an Internet-connected printing appliance for home, office or mobile use. The pen is wireless and communicates securely with the netpage printer via a short-range radio link 9.

The netpage printer 601, preferred forms of which are described in our co-pending applications U.S. Ser. No. 09/722,142 and U.S. Ser. No. 09/693,514, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers, for example as described in our co-pending application U.S. Ser. No. 09/575,141. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. The netpage printer can also operate with slower connections, but with longer delivery times and lower image quality. The netpage system can also be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or e-mail address.

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled. An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line. A generalization relationship ("is-a") is drawn as a solid line joining two classes, with an arrow (in the form of an open triangle) at the generalization end. When a class diagram is broken up into multiple diagrams, any class which is duplicated is shown with a dashed outline in all but the main diagram which defines it. It is shown with attributes only where it is defined.

Netpages are the foundation on which a netpage network is built. They provide a paper-based user interface to published information and interactive services. A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 3:
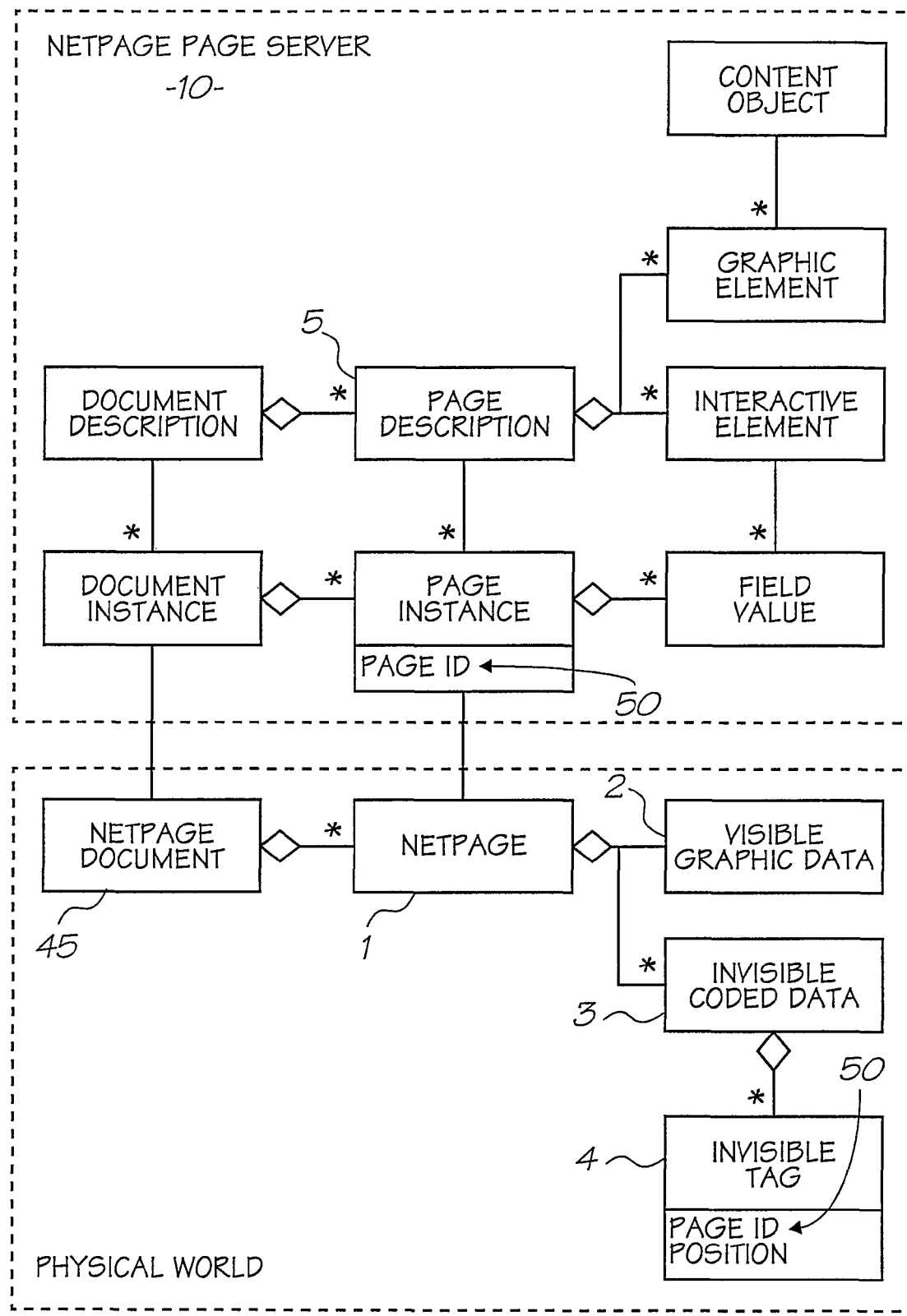
FIG. 3 is a schematic view of a high-level structure of a printed netpage and its online page description.

The relationship between the page description, the page instance, and the printed netpage is shown in FIG. 3. The printed netpage may be part of a printed netpage document 45. The page instance is associated with both the netpage printer which printed it and, if known, the netpage user who requested it.

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

In a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag contains typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ (~$10^{27}$ or a thousand trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates.

In one embodiment, 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword. Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

Figure 4A:
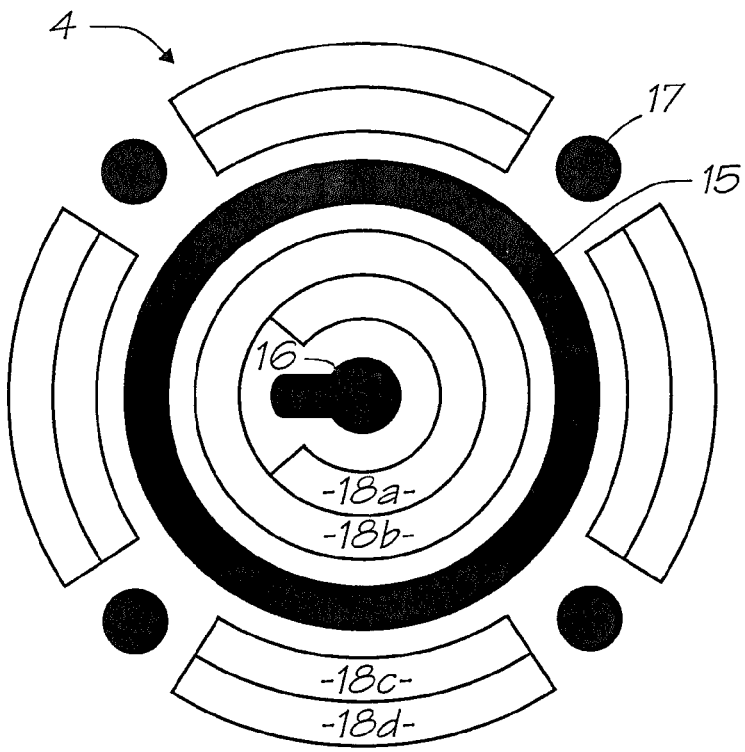
FIG. 4a is a plan view showing a structure of a netpage tag.

One embodiment of the physical representation of the tag, shown in FIG. 4*a* and described in our co-pending application U.S. Ser. No. 09/575,129, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges. The fifteen 4-bit data symbols of each of the six codewords are allocated to the four concentric symbol rings 18*a* to 18*d* in interleaved fashion. Symbols are allocated alternately in circular progression around the tag. The interleaving is designed to maximise the average spatial distance between any two symbols of the same codeword.

Figure 4B:
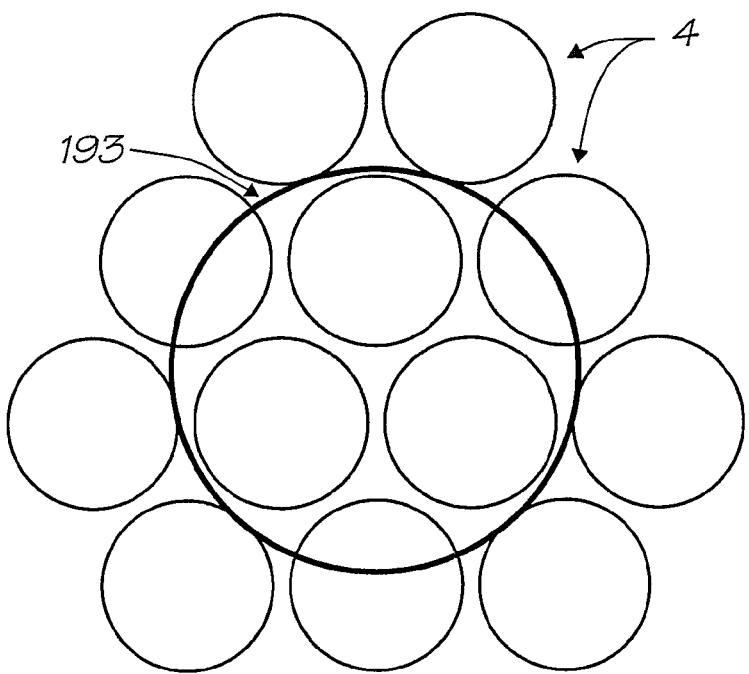
FIG. 4b is a plan view showing a relationship between a set of the tags shown in FIG. 4a and a field of view of a netpage sensing device.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags. Assuming a circular tag shape, the minimum diameter of the sensor field of view 193 is obtained when the tags are tiled on a equilateral triangular grid, as shown in FIG. 4b.

The tag image processing and decoding performed by a sensing device such as the netpage pen is shown in FIG. 6. While a captured image is being acquired from the image sensor, the dynamic range of the image is determined (at 20). The center of the range is then chosen as the binary threshold for the image 21. The image is then thresholded and segmented into connected pixel regions (i.e. shapes 23) (at 22). Shapes which are too small to represent tag target structures are discarded. The size and centroid of each shape is also computed.

Binary shape moments 25 are then computed (at 24) for each shape, and these provide the basis for subsequently locating target structures. Central shape moments are by their nature invariant of position, and can be easily made invariant of scale, aspect ratio and rotation.

The ring target structure 15 is the first to be located (at 26). A ring has the advantage of being very well behaved when perspective-distorted. Matching proceeds by aspect-normalizing and rotation-normalizing each shape's moments. Once its second-order moments are normalized the ring is easy to recognize even if the perspective distortion was significant. The ring's original aspect and rotation 27 together provide a useful approximation of the perspective transform.

The axis target structure 16 is the next to be located (at 28). Matching proceeds by applying the ring's normalizations to each shape's moments, and rotation-normalizing the resulting moments. Once its second-order moments are normalized the axis target is easily recognized. Note that one third order moment is required to disambiguate the two possible orientations of the axis. The shape is deliberately skewed to one side to make this possible. Note also that it is only possible to rotation-normalize the axis target after it has had the ring's normalizations applied, since the perspective distortion can hide the axis target's axis. The axis target's original rotation provides a useful approximation of the tag's rotation due to pen yaw 29.

The four perspective target structures 17 are the last to be located (at 30). Good estimates of their positions are computed based on their known spatial relationships to the ring and axis targets, the aspect and rotation of the ring, and the rotation of the axis. Matching proceeds by applying the ring's normalizations to each shape's moments. Once their second-order moments are normalized the circular perspective targets are easy to recognize, and the target closest to each estimated position is taken as a match. The original centroids of the four perspective targets are then taken to be the perspective-distorted corners 31 of a square of known size in tag space, and an eight-degree-of-freedom perspective transform 33 is inferred (at 32) based on solving the well-understood equations relating the four tag-space and image-space point pairs (see Heckbert, P., Fundamentals of Texture Mapping and Image Warping, Masters Thesis, Dept. of EECS, U. of California at Berkeley, Technical Report No. UCB/CSD 89/516, June 1989, the contents of which are herein incorporated by cross-reference).

The inferred tag-space to image-space perspective transform is used to project (at 36) each known data bit position in tag space into image space where the real-valued position is used to bilinearly interpolate (at 36) the four relevant adjacent pixels in the input image. The previously computed image threshold 21 is used to threshold the result to produce the final bit value 37.

Once all 360 data bits 37 have been obtained in this way, each of the six 60-bit Reed-Solomon codewords is decoded (at 38) to yield 20 decoded bits 39, or 120 decoded bits in total. Note that the codeword symbols are sampled in codeword order, so that codewords are implicitly de-interleaved during the sampling process.

The ring target 15 is only sought in a subarea of the image whose relationship to the image guarantees that the ring, if found, is part of a complete tag. If a complete tag is not found and successfully decoded, then no pen position is recorded for the current frame. Given adequate processing power and ideally a non-minimal field of view 193, an alternative strategy involves seeking another tag in the current image.

The obtained tag data indicates the identity of the region containing the tag and the position of the tag within the region. An accurate position 35 of the pen nib in the region, as well as the overall orientation 35 of the pen, is then inferred (at 34) from the perspective transform 33 observed on the tag and the known spatial relationship between the pen's physical axis and the pen's optical axis.

The tag structure just described is designed to allow both regular tilings of planar surfaces and irregular tilings of non-planar surfaces. Regular tilings are not, in general, possible on non-planar surfaces. In the more usual case of planar surfaces where regular tilings of tags are possible, i.e. surfaces such as sheets of paper and the like, more efficient tag structures can be used which exploit the regular nature of the tiling.

Figure 5A:
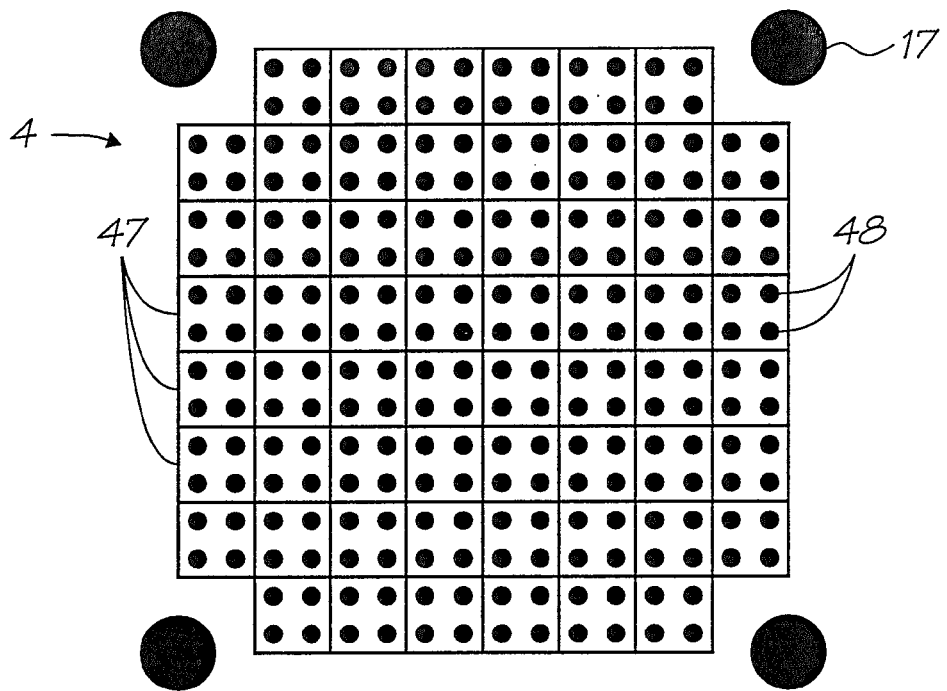
FIG. 5a is a plan view showing an alternative structure of a netpage tag.
Figure 5B:
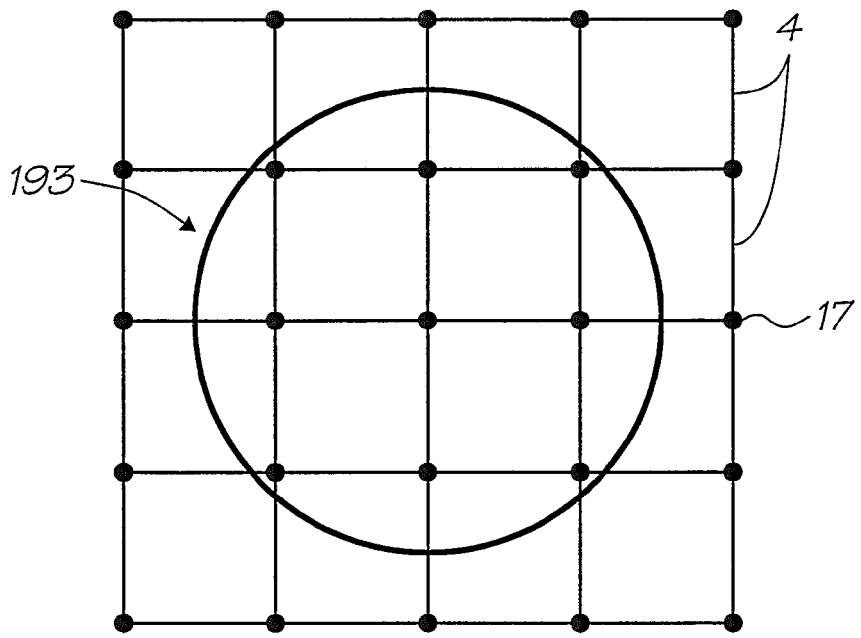
FIG. 5b is a plan view showing a relationship between a set of the tags shown in FIG. 5a and a field of view of a netpage sensing device.
Figures 5C, 5D:
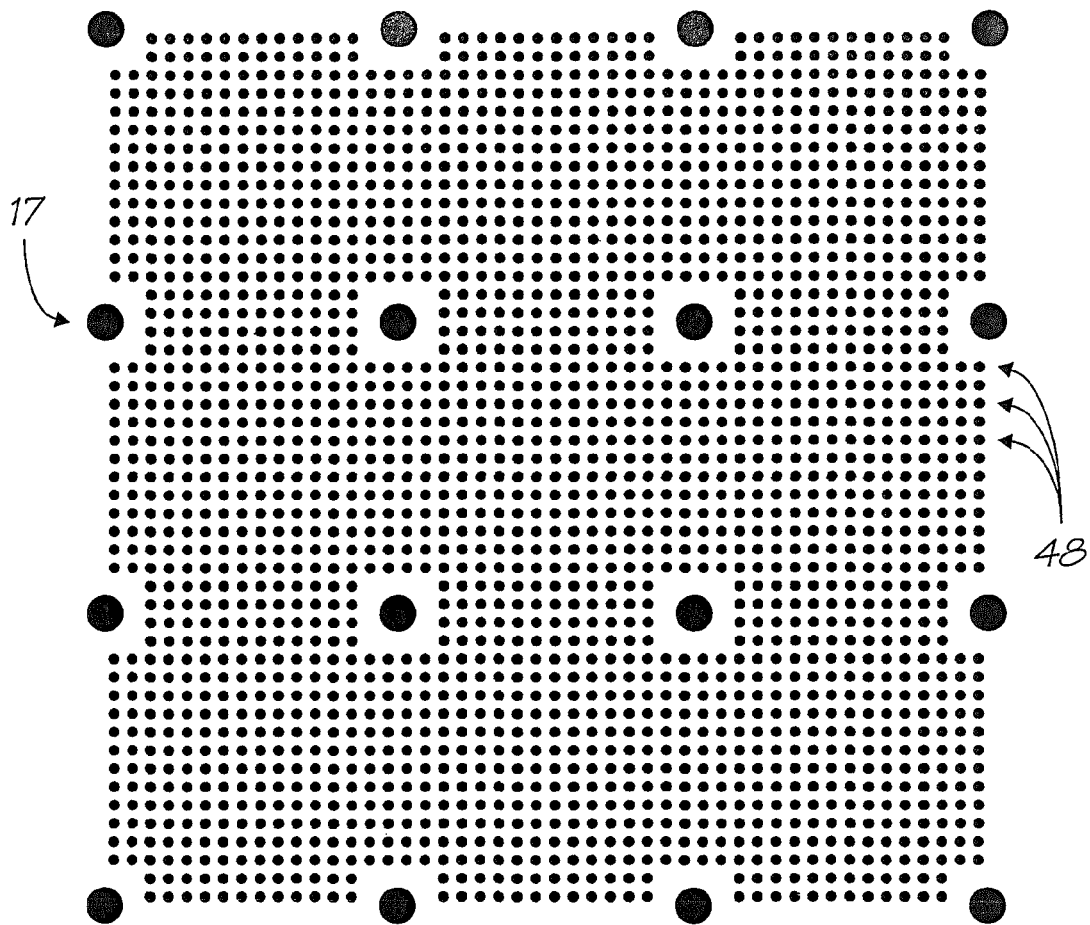

An alternative tag structure more suited to a regular tiling is shown in FIG. 5a. The tag 4 is square and has four perspective targets 17. It is similar in structure to tags described by Bennett et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 5b and 5c. FIG. 5b shows a square tiling of 16 tags and the corresponding minimum field of view 193, which must span the diagonals of two tags. FIG. 5c shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits. The data-bearing dots 48 of the tag are designed to not overlap their neighbors, so that groups of tags cannot produce structures which resemble targets. This also saves ink. The perspective targets therefore allow detection of the tag, so further targets are not required. Tag image processing proceeds as described above, with the exception that steps 26 and 28 are omitted.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 5d, where each symbol is labelled with the number of its codeword (1-4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. A tag map reflects the scheme used to tile the surface region with tags, and this can vary according to surface type. When multiple tagged regions share the same tiling scheme and the same tag numbering scheme, they can also share the same tag map. The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encoded Cartesian coordinates or polar coordinates, depending on the surface type on which it appears. The tag ID structure is dictated by and known to the tag map, and tag IDs associated with different tag maps may therefore have different structures.

Two distinct surface coding schemes are of interest, both of which use the tag structure described earlier in this section. The preferred coding scheme uses "location-indicating" tags as already discussed. An alternative coding scheme uses "object-indicating" (or "function-indicating") tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating (or function-indicating) tag contains a tag ID which directly identifies a user interface element in the page description associated with the region (or equivalently, a function). All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined. As an alternative, the netpage pen 101 can contain a pair or motion-sensing accelerometers, as described in our co-pending application U.S. Ser. No. 09/721,893.

An embodiment of the present invention, in the form of tags which encode functional attributes, will now be described.

A tag may contain flags which relate to the region as a whole or to the tag.

One or more flag bits may, for example, signal a tag sensing device to provide feedback indicative of a function associated with the immediate area of the tag, without the sensing device having to refer to a description of the region.

A tag may contain one or more "active area" bits, indicating that a particular subregion in the vicinity of the tag is in the zone of a hyperlink or other active page element. The sensing device can provide feedback to the user, e.g. by illuminating an "active area" LED, whenever the sensing device is positioned in a subregion corresponding to a particular set bit. The sensing device can provide further feedback when the user clicks in the subregion, to indicate that the click was in an "active" subregion. This can provide confirmation to the user that a click on a hyperlink succeeded, even if the user is operating offline. The page server which eventually processes the corresponding digital ink input can know that the user received affirmative feedback at the time the click was captured, and can thus ensure that the click succeeds even if a hit test between the click and a precise definition of the hyperlink's zone would otherwise fail. The page server can deduce from the digital ink position samples, with reference to the page description, what feedback the user would have received. Alternatively, each position sample can include the corresponding "active area" bit value actually encountered.

A tag may also contain one or more "signature area" bits, indicating that a particular subregion in the vicinity of the tag is in the zone of a signature field. The sensing device can provide feedback to the user, e.g. by illuminating a "signature area" LED, whenever the sensing device is positioned in a subregion corresponding to a particular set bit. This can provide feedback to the user that a signature is knowingly being captured by the system. On this basis, the user learns to associate the feedback with a genuine signature field, and thereby learns to mistrust a field purporting to be a signature field but which fails to generate the proper feedback. Without such feedback a "Trojan horse" can be used to steal a user's signature via a drawing field masquerading as a signature field. To prevent the inclusion of fake "signature area" bits in the tags of a drawing field, the bits are automatically generated by the system. However, to prevent a forged page being used successfully, each position sample ideally includes the corresponding "signature area" bit value actually encountered. If a page server receives unexpected "signature area" bits then it can report the forgery, and at a minimum it can treat the input as a genuine signature, whose digital ink is never forwarded to an application anyway, but is instead used as the basis for verifying user identity and generating a digital signature of form content.

Tags typically have a diameter of a few millimeters. Defining functional areas (such as active areas and signature areas)

at tag resolution may therefore not be ideal. To overcome this, a number of flag bits within a tag can be dedicated to defining a particular functional area, with each flag bit corresponding to a subregion in the vicinity of the tag. A group of such flag bits can define a bitmap whose organization corresponds to the spatial organization of the corresponding subregions. The subregions typically fully tile the area of the tag, so that any subregion of the area of the tag can be included in a functional area. Assuming a subdivision factor of n, i.e. a square tag is tiled with n by n subregions, a bitmap of $n^2$ bits is required.

The field of view of the sensing device is designed so that a complete tag is guaranteed to be captured at any position on a surface, subject only to the allowed tilt range of the sensing device. The center of the field of view therefore lies inside a complete tag. Furthermore, the field of view is not designed to guarantee that more than one complete tag is imaged at any particular position. Since the nib of the pen is offset from the optical axis by at least the diameter of a tag, i.e. to prevent it from obscuring the tag, it is possible for its position to lie outside the only complete tag imaged.

As a consequence of the nib being offset from the center of the field of view, any functional area bitmap within a tag must actually cover an area larger than the area of the tag.

If the nib offset is given by S and the pen tilt by $\theta$, then the offset when the pen is tilted is given by:

$$S' = S/\cos\theta$$

As the tilt increases so does the nib offset, and with a maximum pitch-induced tilt of 48 degrees, as discussed in our co-pending application U.S. Ser. No. 09/575,129, the maximum nib offset is given by:

$$S' = 3S/2$$

If the tag diameter is k and the nib offset S is minimized, i.e. it is equal to the tag diameter, then the maximum nib offset is approximated by:

$$S' = 3k/2$$

Based on this assumption, the maximum number of tags (or tag subregions) spanned by the center of the field of view (FOV) and the nib can be analyzed by considering various arrangements of the center-to-nib vector with respect to a square tag array.

In the diagrams the FOV is shown as a circle of appropriate diameter, with a small open circle representing its center. The active tag, which contains the FOV center, is shown as a square with a thick outline. Other relevant tags are shown as squares with thin outlines. The nib position is shown as a filled circle. In diagrams illustrating zero tilt, the center-to-nib separation is the same as the tag diameter, while in diagrams illustrating maximum tilt, the center-to-nib separation is as given above. The FOV center is always shown in a position which maximizes the number of tags spanned by the center-to-nib vector. The tag in which the nib lies is shown with four subregions.

Figure 6A:
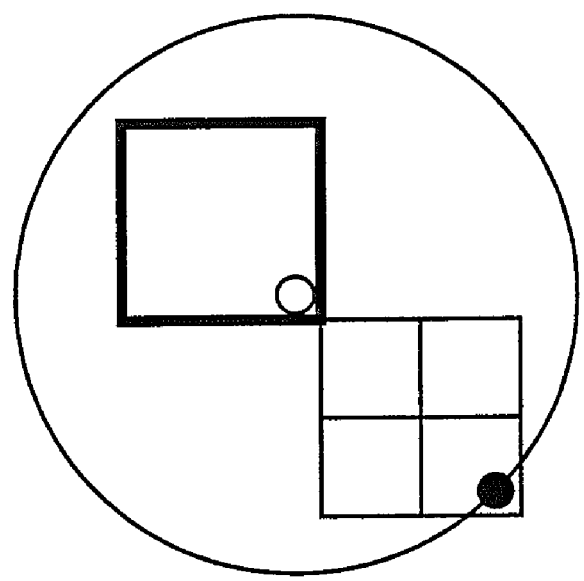
FIG. 6a is a schematic view showing a tag diagonal relationship between a nib and a sensing device field of view at zero tilt.
Figure 6B:
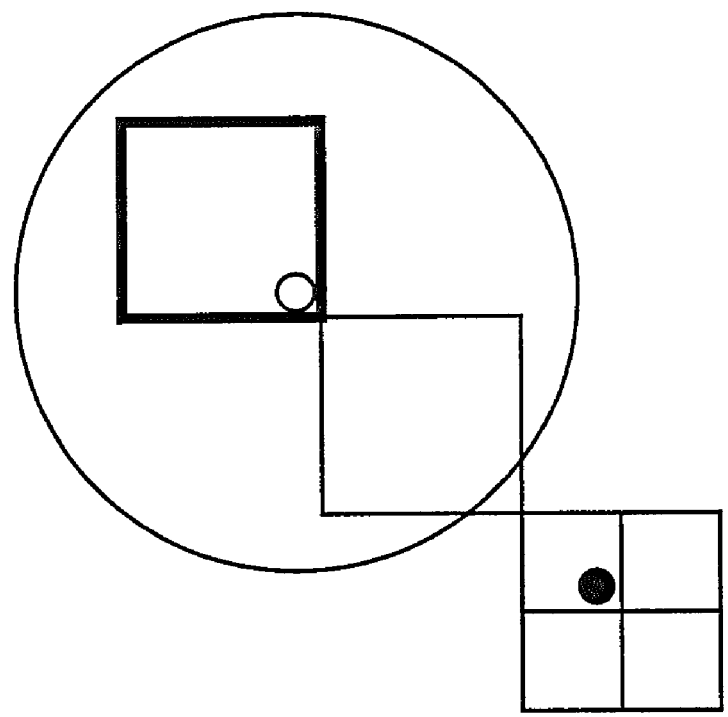
FIG. 6b is a schematic view showing a tag diagonal relationship between a nib and a sensing device field of view at maximum tilt.

When the center-to-nib vector is arranged diagonally to the tags and the pen is at zero tilt, as illustrated in FIG. 6a, the nib lies in a tag diagonally adjacent to the active tag. When the pen is at maximum tilt, as illustrated in FIG. 6b, the nib lies in a further diagonally adjacent tag. Because the center-to-nib separation increases rapidly with tilt while the size of the FOV increases only slowly, the tag which lies between the active tag and the tag in which the nib lies does not enter the FOV soon enough to provide an alternative active tag.

Figure 6C:
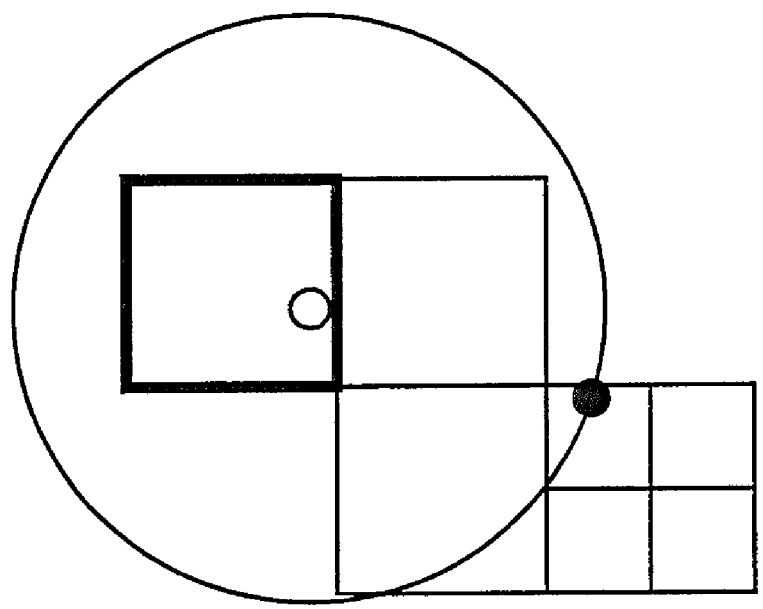
FIG. 6c is a schematic view showing a tag off-diagonal relationship between a nib and a sensing device field of view at zero tilt.
Figure 6D:
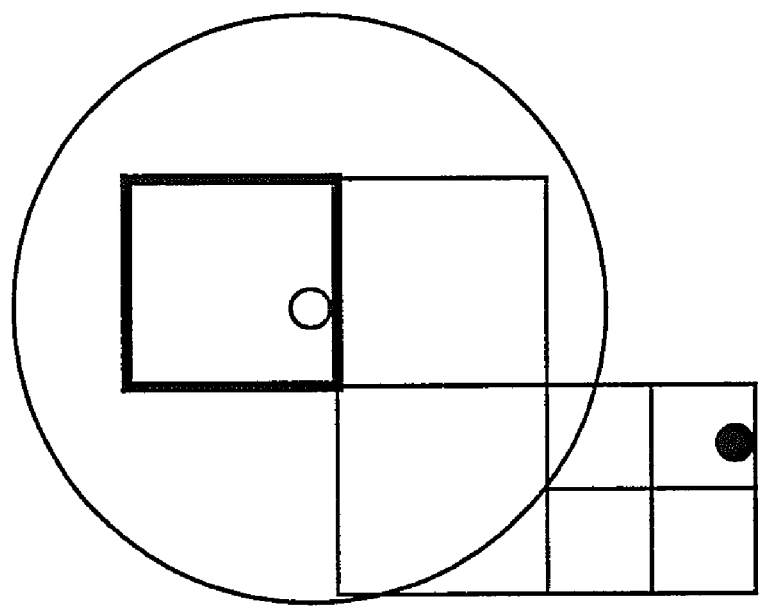
FIG. 6d is a schematic view showing a tag off-diagonal relationship between a nib and a sensing device field of view at maximum tilt.

When the center-to-nib vector is arranged off-diagonally to the tags and the pen is at zero tilt, as illustrated in FIG. 6c, the nib lies in a tag beyond a tag diagonally adjacent to the active tag. When the pen is at maximum tilt, as illustrated in FIG. 6d, the nib lies in the same tag, but in a different subregion.

Figure 6E:
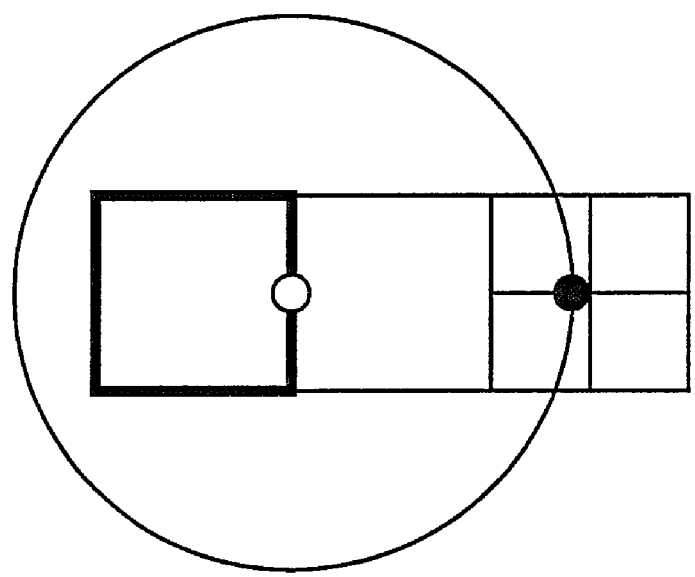
FIG. 6e is a schematic view showing a tag parallel relationship between a nib and a sensing device field of view at zero tilt.
Figure 6F:
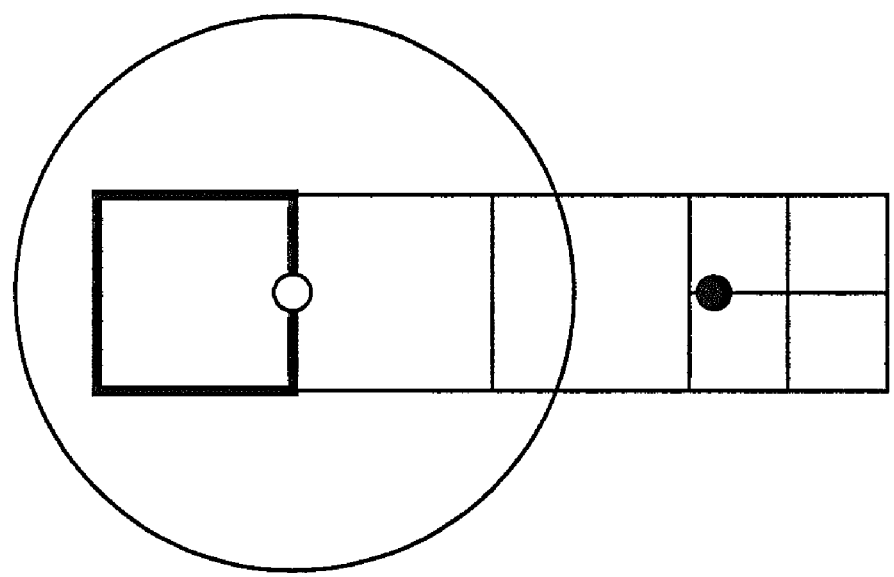
FIG. 6f is a schematic view showing a tag parallel relationship between a nib and a sensing device field of view at maximum tilt.

When the center-to-nib vector is arranged parallel to the tags and the pen is at zero tilt, as illustrated in FIG. 6e, the nib lies in a tag two tags beyond the active tag. When the pen is at maximum tilt, as illustrated in FIG. 6f, the nib lies in a tag three tags beyond the active tag. In this case, however, the tag adjacent to the active tag provides an alternative active tag, as illustrated in both FIG. 6e and FIG. 6f.

Figure 7A:
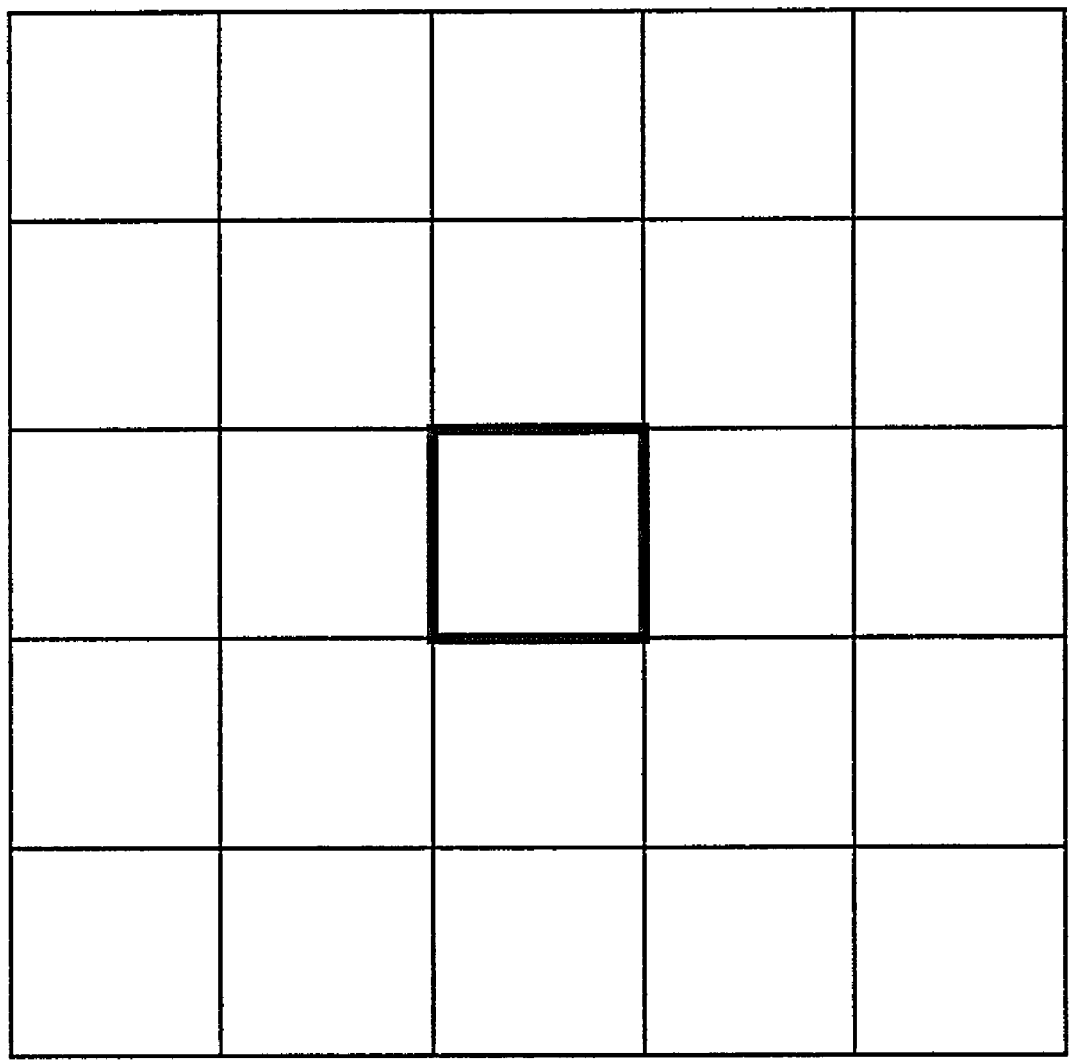
FIG. 7a is a schematic view showing a set of tags covered by a functional area bitmap.
Figure 7B:
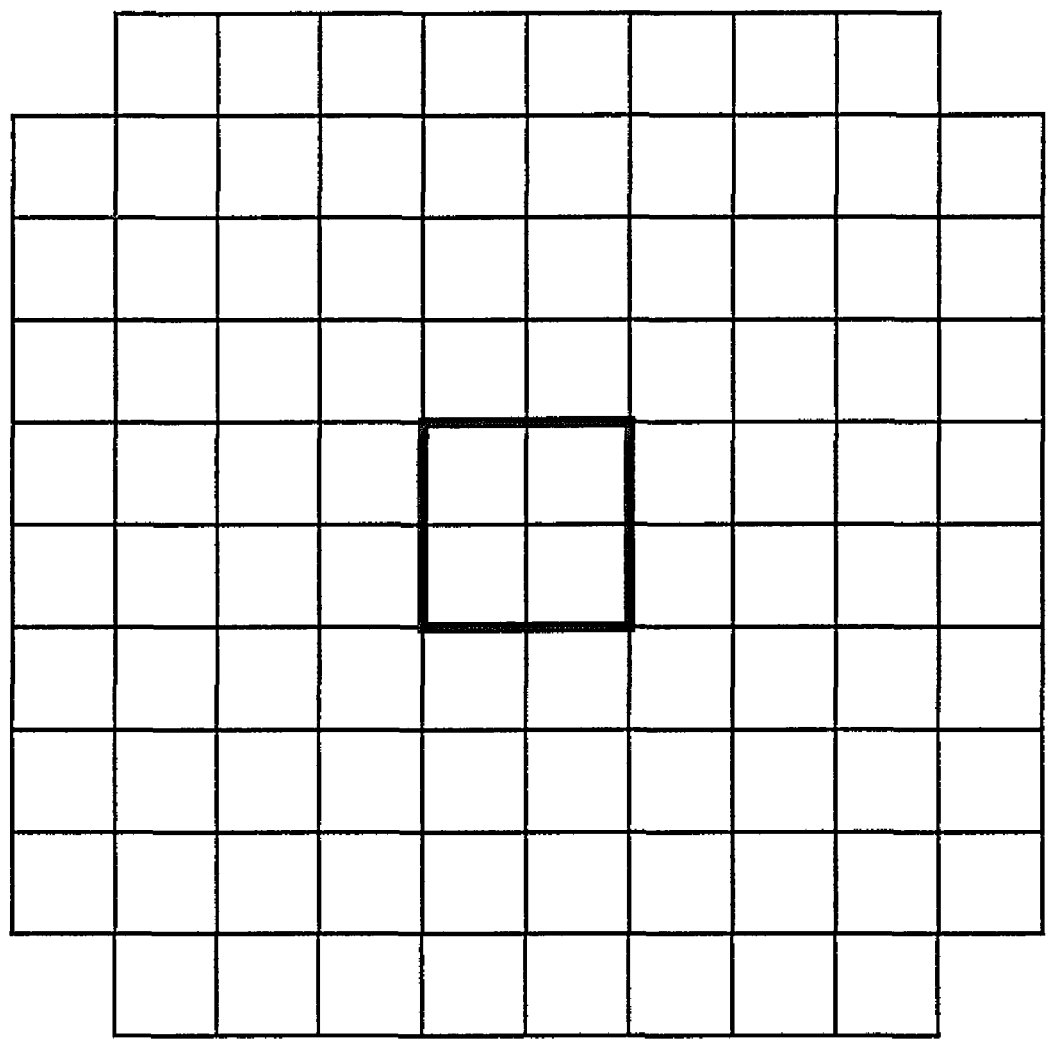
FIG. 7b is a schematic view showing a set of subregions covered by a functional area bitmap.

FIG. 7a shows the consequent extent of a functional area bitmap when there is one subregion per tag. It has a storage requirement of 25 bits. FIG. 7b shows the extent of a functional area bitmap when there are four subregions per tag. It has a storage requirement of 96 bits.

The size of a functional area bitmap can obviously be minimized by minimizing the number of subregions per tag. It can also be minimized by limiting the allowed tilt range of the pen. Conversely, the size of the bitmap may increase if the nib offset is increased.

Feedback based on functional areas such as active areas and signature areas can of course also be provided by the pen based on information in the page description provided by the page server to the pen via the base station. Although this route has higher latency and doesn't function when the pen is offline, it has the advantage of not consuming potentially scarce tag data bits.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A region having coded data thereon, at least some of the coded data including data indicative of a functional attribute of a part of the region and the coded data comprising a plurality of substantially undifferentiated marks positioned relative to a set of predetermined nominal mark positions,
   wherein each mark has a minimum radius and a maximum radius, the length of a mark's minimum radius being greater than 40% of the length of that mark's maximum radius.

2. The region according to claim 1, wherein each mark represents one of a plurality of coded values.

3. The region according to claim 2, wherein the coded value represented by a mark is at least partially determined by the position of the mark relative to the set of predetermined nominal mark positions.

4. The region according to claim 1, wherein the predetermined nominal mark positions are arranged relative to a plurality of nominal lines.

5. The region according to claim 4 wherein at least one pair of the lines are spaced apart from one another by a distance of less than 100 millimeters.

6. The region according to claim 1, wherein the marks have centers and wherein the relative spacing of the centers of at least one pair of adjacent marks is less than 12 millimeters.

7. The region according to claim 1, wherein any 10 millimeter diameter area of the coded data indicative of the functional attribute of a part of the region includes sufficient information to identify the functional attribute.

8. A method of coding a region including applying coded data to a least a part of the region, the coded data being indicative of a functional attribute of a part of the region and comprising a plurality of substantially undifferentiated marks positioned relative to a set of predetermined nominal mark positions, wherein each mark has a minimum radius and a maximum radius, the length of a mark's minimum radius being greater than 40% of the length of that mark's maximum radius.

9. The method according to claim 8, wherein each mark represents one of a plurality of coded values.

10. The method according to claim 9, wherein the coded value represented by a mark is at least partially determined by the position of the mark relative to the set of predetermined nominal mark positions.

11. The method according to claim 8, wherein the predetermined nominal mark positions are arranged relative to a plurality of nominal lines.

12. The method according to claim 11, wherein at least one pair of the lines are spaced apart from one another by a distance of less than 100 millimeters.

13. The method according to claim 8, wherein the marks have centers and wherein the relative spacing of the centers of at least one pair of adjacent marks is less than 12 millimeters.

14. The method according to claim 8, wherein any 10 millimeter diameter area of the coded data indicative of the functional attribute of a part of the region includes sufficient information to identify the functional attribute.

15. A system including:
computer system, and
a sensing device for use with a region having coded data thereon, the coded data comprising a plurality of substantially undifferentiated marks positioned relative to a set of predetermined nominal mark positions and at least some of the coded data including data indicative of a functional attribute of a part of the region, each mark having a minimum radius and a maximum radius, the length of a mark's minimum radius being greater than 40% of the length of that mark's maximum radius, the sensing device for sensing coded data indicative of a functional attribute of a part of the region and for transmitting, to the computer system, said sensed data or data based at least partially on said sensed data, wherein the computer system executes, or commences execution of, a function related to the functional attribute of the sensed data.

16. The system of claim 15, wherein the computer system verifies that the functional attribute is consistent with an expected attribute of the respective part of the region.

17. The system according to claim 15, wherein each mark represents one of a plurality of coded values.

18. The system according to claim 17, wherein the coded value represented by a mark is at least partially determined by the position of the mark relative to the set of predetermined nominal mark positions.

19. The system according to claim 15, wherein the predetermined nominal mark positions are arranged relative to a plurality of nominal lines.

20. The system according to claim 15, wherein any 10 millimeter diameter area of the coded data indicative of the functional attribute of a part of the region includes sufficient information to identify the functional attribute.

* * * * *